US010810441B2

(12) United States Patent
Domaratsky et al.

(10) Patent No.: US 10,810,441 B2
(45) Date of Patent: Oct. 20, 2020

(54) SYSTEMS AND METHODS FOR IDENTIFYING HIERARCHICAL STRUCTURES OF MEMBERS OF A CROWD

(71) Applicant: MOTOROLA SOLUTIONS, INC., Chicago, IL (US)

(72) Inventors: Yaroslav Alexandrovich Domaratsky, St. Petersburg (RU); Nikita Sergeevich Gerasimov, St. Petersburg (RU)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 88 days.

(21) Appl. No.: 16/324,689

(22) PCT Filed: Aug. 16, 2016

(86) PCT No.: PCT/RU2016/000553
§ 371 (c)(1),
(2) Date: Feb. 11, 2019

(87) PCT Pub. No.: WO2018/034584
PCT Pub. Date: Feb. 22, 2018

(65) Prior Publication Data
US 2019/0188491 A1   Jun. 20, 2019

(51) Int. Cl.
*G06K 9/00*   (2006.01)
*G06Q 50/00*   (2012.01)
(Continued)

(52) U.S. Cl.
CPC ......... *G06K 9/00778* (2013.01); *G06F 17/18* (2013.01); *G06K 9/00295* (2013.01);
(Continued)

(58) Field of Classification Search
CPC .......... G06K 9/00778; G06K 9/00295; G06K 9/00348; G06Q 50/01; G06Q 50/265; G06F 17/18
See application file for complete search history.

(56) References Cited

U.S. PATENT DOCUMENTS 5,666,157 A   9/1997   Aviv
9,818,042 B2   11/2017   Capota et al.
(Continued)

OTHER PUBLICATIONS

Smith, "Facial recognition: Identifying faces in a crowd in real-time: Network World," Sep. 6, 2010 (Sep. 6, 2010), XP055369186, Retrieved from the Internet: URL:http://www.networkworld.com/article/22 27084/microsoft-subnet/facial-recognition-identifying-faces-in-a-crowd-in-real-time.html [retrieved on May 3, 2017].
(Continued)

*Primary Examiner* — Ping Y Hsieh
(74) *Attorney, Agent, or Firm* — Michael Best & Friedrich LLP

(57) ABSTRACT

A method and system for identifying hierarchical structures of members of a crowd (126). One method (400) includes determining a movement of at least one of a plurality of members of the crowd (126) based on image data from a camera (120). The method (400) includes determining a first probability that a first member of the plurality of members is leading other members based on the movement. The method (400) includes determining a second probability that the first member is leading the other members based on a relationship between the first member and the other members determined based on social media information. The method (400) includes determining a combined probability that the first member is leading the other members based on the first probability and the second probability. The method (400) includes transmitting a message indicating a leader-
(Continued)

ship association between the first member and the other members.

20 Claims, 3 Drawing Sheets

(51) Int. Cl.
G06F 17/18 (2006.01)
G06Q 50/26 (2012.01)
(52) U.S. Cl.
CPC ......... *G06K 9/00348* (2013.01); *G06Q 50/01* (2013.01); *G06Q 50/265* (2013.01)

(56) References Cited

U.S. PATENT DOCUMENTS

| | | | |
|---|---|---|---|
| 2007/0174272 A1* | 7/2007 | Carter | G06K 9/72 |
| 2010/0046842 A1 | 2/2010 | Conwell | |
| 2010/0245567 A1* | 9/2010 | Krahnstoever | G06K 9/00677 |
| | | | 348/143 |
| 2012/0230539 A1 | 9/2012 | Calman et al. | |
| 2013/0156299 A1 | 6/2013 | Zhang et al. | |
| 2013/0339286 A1 | 12/2013 | Yahalom et al. | |
| 2014/0118543 A1 | 5/2014 | Kerbs et al. | |

OTHER PUBLICATIONS

PCT/RU2016/000553 International Search Report and Written Opinion of the International Searching Authority dated May 12, 2017 (17 pages).

* cited by examiner

SYSTEMS AND METHODS FOR IDENTIFYING HIERARCHICAL STRUCTURES OF MEMBERS OF A CROWD

BACKGROUND OF THE INVENTION

Public safety personnel (for example, police officers, firefighters, paramedics, and the like) may manually monitor crowds of people. Public safety personnel, particularly police and security officers, may attempt to maintain order among the people in a crowd based on information obtained via such monitoring. In many cases, certain people in the crowd may be leading or influencing other people in the crowd.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
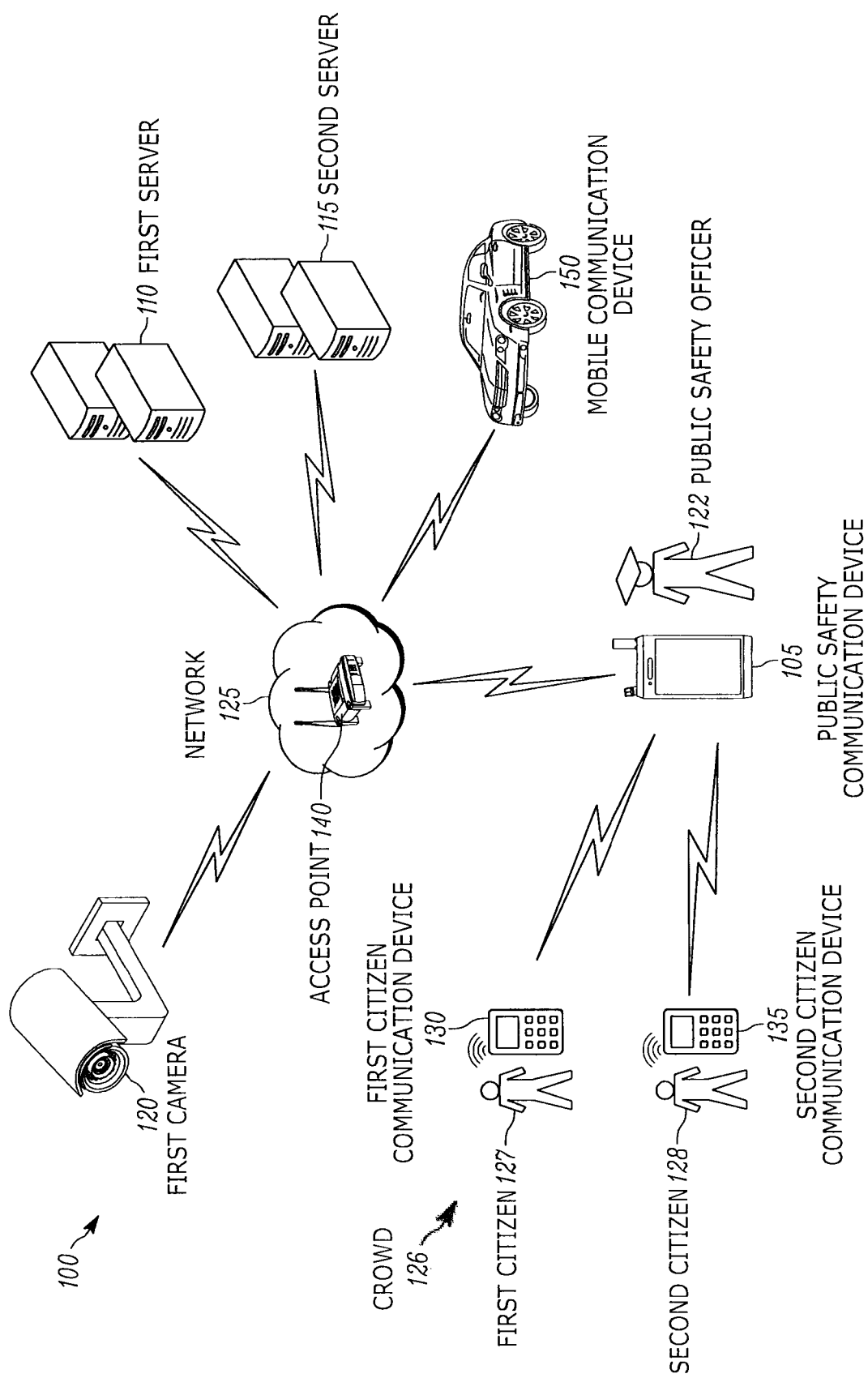
FIG. 1 is a diagram of a communication system according to one exemplary embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method for identifying hierarchical structures of members of a crowd. The method includes receiving, with a network interface of a computer, image data of the crowd from a camera. The method includes determining, with a video analytics engine of the computer, a movement of at least one of a plurality of members of the crowd based on the image data. The method includes determining, with an electronic processor of the computer, a first probability that a first member of the plurality of members is leading other members of the plurality of members based on the movement. The method includes identifying, with the video analytics engine of the computer, the first member of the plurality of members. The method includes identifying, with the video analytics engine of the computer, the other members of the plurality of members. The method includes transmitting, with the network interface of the computer, a request for social media information for the first member and for the other members to another computer. The method includes receiving, with the network interface of the computer, the social media information. The method includes determining, with a social media analytics engine of the computer and based on the social media information, a relationship between the first member and the other members. The method includes determining, with the electronic processor of the computer, a second probability that the first member is leading the other members based on the relationship. The method includes determining, with the electronic processor of the computer, a combined probability that the first member is leading the other members based on the first probability and the second probability. The method includes transmitting, with the network interface of the computer, a message indicating a leadership association between the first member and the other members to one or more communication devices when the combined probability exceeds a predetermined threshold.

Another embodiment provides a computer for identifying hierarchical structures of members of a crowd. The computer includes an electronic processor with a video analytics engine and a social media analytics engine. The computer includes a network interface. The computer is configured to receive, with the network interface, image data of the crowd from a camera. The computer is configured to determine, with the video analytics engine, a movement of at least one of a plurality of members of the crowd based on the image data. The computer is configured to determine, with the electronic processor, a first probability that a first member of the plurality of members is leading other members of the plurality of members based on the movement. The computer is configured to identify, with the video analytics engine, the first member of the plurality of members. The computer is configured to identify, with the video analytics engine, the other members of the plurality of members. The computer is configured to transmit, with the network interface, a request for social media information for the first member and for the other members to a second computer. The computer is configured to receive, with the network interface, the social media information. The computer is configured to determine, with the social media analytics engine and based on the social media information, a relationship between the first member and the other members. The computer is configured to determine, with the electronic processor, a second probability that the first member is leading the other members based on the relationship. The computer is configured to determine, with the electronic processor, a combined probability that the first member is leading the other members based on the first probability and the second probability. The computer is configured to transmit, with the network interface, a message indicating a leadership association between the first member and the other members to one or more communication devices when the combined probability exceeds a predetermined threshold.

Another embodiment provides a communication device that includes a display, a network interface, and an electronic processor with a video analytics engine and a social media analytics engine. The communication device is configured to receive, with the network interface, image data of a crowd from a camera. The communication device is configured to determine, with the video analytics engine, a movement of at least one of a plurality of members of the crowd based on the image data. The communication device is configured to determine, with the electronic processor, a first probability that a first member of the plurality of members is leading other members of the plurality of members based on the movement. The communication device is configured to identify, with the video analytics engine, the first member of the plurality of members. The communication device is configured to identify, with the video analytics engine, the other members of the plurality of members. The communication device is configured to transmit, with the network interface, a request for social media information for the first member and for the other members to a computer. The communication device is configured to receive, with the network interface, the social media information. The communication device is configured to determine, with the social media analytics engine and based on the social media information, a relationship between the first member and the other members. The communication device is configured to determine, with the electronic processor, a second probability that the first member is leading the other members based on the relationship. The communication device is configured to determine, with the electronic processor, a combined probability that the first member is leading the other members based on the first probability and the second probability. The communication device is configured to display a leadership association between the first member and the other members on the display when the combined probability exceeds a predetermined threshold.

For ease of description, some or all of the exemplary systems presented herein are illustrated with a single exemplar of each of its component parts or a limited number of component parts. Some examples may not describe or illustrate all components of the systems. Other exemplary embodiments may include more or fewer of each of the illustrated components, may combine some components, or may include additional or alternative components. Additionally, systems and devices may perform functionality other than the functionality described.

FIG. 1 is a diagram of a communication system 100 according to one exemplary embodiment. In the example illustrated, the communication system 100 includes a public safety communication device 105, a first server 110, a second server 115, a first camera 120, and a network 125. The public safety communication device 105, the first server 110, the second server 115, and the first camera 120 communicate with each other over the network 125.

In some embodiments, the public safety communication device 105 is carried and used by a public safety officer 122 (for example, a police officer, a firefighter, a paramedic, and the like). For example, the public safety communication device 105 may be a cellular telephone, a portable radio, a mobile radio mounted in or on a vehicle, tablet, a smart watch, and the like. In some embodiments, the first server 110 is a computer maintained, for example, at a call center or public safety command center. In some embodiments, the second server 115 is a computer maintained by a third party (for example, an organization running a social media platform). The first camera 120 may be a camera mounted on or in a building (for example, a pan-tilt-zoom camera). In some embodiments, the first camera 120 is mounted in or on a public safety vehicle.

The network 125 may be a wired or a wireless communication network. All or parts of the network 125 may be implemented using various existing networks. The network 125 may also include future developed networks.

In some embodiments, the public safety communication device 105 communicates with other public safety communication devices over the network 125 (for example, public safety communication devices carried by other public safety personnel and mobile communication devices mounted in or on public safety vehicles). In some embodiments, the public safety communication device 105 communicates with the first camera 120 and the other public safety communication devices using an ad-hoc network or through direct links, for example, a two-way radio channel.

The communication system 100 monitors a crowd 126 of people via, for example, the first camera 120. The crowd 126 includes a first citizen 127 and a second citizen 128. In some situations, the first citizen 127 carries and uses a first citizen communication device 130, and the second citizen 128 carries and uses a second citizen communication device 135. The citizen communication devices 130 and 135 may be smart phones, tablets, smart watches, and the like. In some embodiments, the public safety communication device 105 communicates with the citizen communication devices 130 and 135. Such communication may occur wirelessly over the network 125 or over another network (for example, a Bluetooth™ network). In some embodiments, the public safety communication device 105 monitors the crowd 126 through communication with the citizen communication devices 130 and 135 as is explained in greater detail, below. The citizen communication devices 130 and 135 may communicate with each other and with other devices over the network 125 or another network.

In addition to the first citizen 127 and the second citizen 128, the crowd 126 may include additional citizens that may each carry and use respective additional citizen communication devices. In some embodiments, the crowd 126 includes the public safety officer 122 (in other words, the public safety officer 122 may be located within the crowd 126).

The network 125 may include one or more access points 140. For example, the access points 140 may be an access point of the network 125 that sends and receives wireless signals to and from other devices (for example, to and from the public safety communication device 105, the first server 110, the first citizen communication device 130, and the like). The access points 140 may be located within or on buildings or towers, on street lights, on light posts, or within or on other stationary objects. In some embodiments, the communication system 100 also includes one or more mobile communication devices 150 located within or on a vehicle (for example, a public safety vehicle such as a police car, an ambulance, and the like). In some embodiments, the mobile communication devices 150 perform similar functions as the public safety communication device 105 or the access points 140. In some embodiments, the first camera 120 is located at or near the location of one of the access points 140 or one of the mobile communication devices 150. When multiple cameras are used, each may be positioned at one of these locations.

Figure 2:
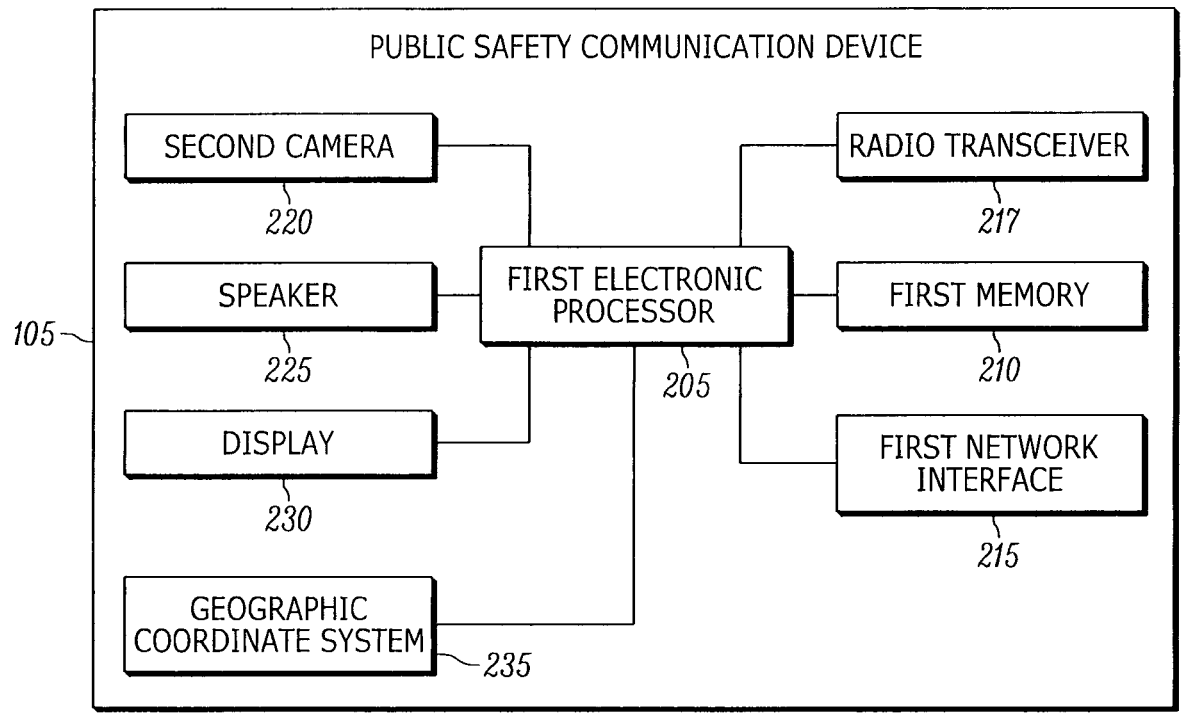
FIG. 2 is a block diagram of a public safety communication device included in the communication system of FIG. 1 according to one exemplary embodiment.

FIG. 2 is a block diagram of the public safety communication device 105. In the example illustrated, the public safety communication device 105 includes a first electronic processor 205 (for example, a microprocessor or another electronic device), a first memory 210, a first network interface 215, a radio transceiver 217, a second camera 220, a speaker 225, a display 230, and a geographic coordinate system 235.

The first memory 210 may include read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform one or more methods described herein. For example, the first electronic processor 205 is configured to identify hierarchical structures of members of the crowd 126 based on information gathered by one or more sources.

The first network interface 215 sends and receives data to and from the network 125 and may include a transceiver for wirelessly communicating with the network 125. The first electronic processor 205 receives image data generated by the second camera 220 and may communicate the image data over the network 125 through the first network interface 215, such as for receipt by another public safety communication device 105, the first server 110, or another external device. The first electronic processor 205 may receive data from the network 125 through the first network interface 215, such as from the first server 110, the second server 115, the first camera 120, or another external device. The first electronic processor 205 may output data received via the first network interface 215 from the network 125 using the speaker 225, the display 230, another output device, or a combination thereof.

The radio transceiver 217 transmits and receives radio signals. For example, in some embodiments, the radio transceiver 217 includes a Bluetooth™ low energy (BLE) transceiver that transmits and receives low-power radio signals. In some embodiments, the radio transceiver 217 allows the public safety communication device 105 to communicate with other communication devices, servers, cameras, or a combination thereof using a communication channel or connection that is outside of the network 125. In some embodiments, the functionality performed by the radio transceiver 217 as described herein is performed by the first network interface 215. Therefore, in these embodiments, the public safety communication device 105 may not include the radio transceiver 217 separate from the first network interface 215.

The second camera 220 is coupled to the public safety communication device 105. In some embodiments, a field of view of the second camera 220 is adjusted either by an electrical signal from the first electronic processor 205 or manually by a user of the public safety communication device 105. In some embodiments, the second camera 220 may be physically separate from the public safety communication device 105 and may be communicatively coupled to the first electronic processor 205. For example, in some embodiments, the public safety communication device 105 is a portable radio carried by a person such as public safety personnel and the second camera 220 is an accessory mounted on an article worn by the person (for example, a jacket, a vest, a helmet, and the like). In another example, in some embodiments, the public safety communication device 105 is a mobile radio mounted inside a public safety vehicle (for example, a police vehicle) and the second camera 220 is mounted within or on the public safety vehicle. In embodiments where the second camera 220 is physically separate from the public safety communication device 105, the first electronic processor 205 may control the second camera 220 via a wired or wireless communication link. In such embodiments, the second camera 220 is considered to be part of the public safety communication device 105 even though the components are physically separated. In some embodiments, the public safety communication device 105 includes multiple second cameras 220 that are controlled by the first electronic processor 205. For example, the public safety communication device 105 may include two opposed cameras (which in one example may be located one hundred eighty degrees from one another).

In some embodiments, the display 230 is a touch-sensitive display that includes both a display device (for example, a liquid crystal display (LCD) screen panel) and a user input device (for example, the touch-sensitive component that detects contact by a stylus or finger). The first electronic processor 205 may receive input signals from the display 230 that are generated by a user of the public safety communication device 105. The first electronic processor 205 may also control content of the display 230 (for example, by providing a graphical user interface on the display 230). The geographic coordinate system 235 is configured to determine the geographic coordinates of the location of the public safety communication device 105. In some embodiments, the location component 240 is a global positioning system (GPS) receiver or a similar component that determines the geographic coordinates of the location of the public safety communication device 105. The first network interface 215 may transmit the geographic coordinates of the public safety communication device 105 to another device such as the first server 110, the first camera 120, and another public safety communication device.

Figure 3:
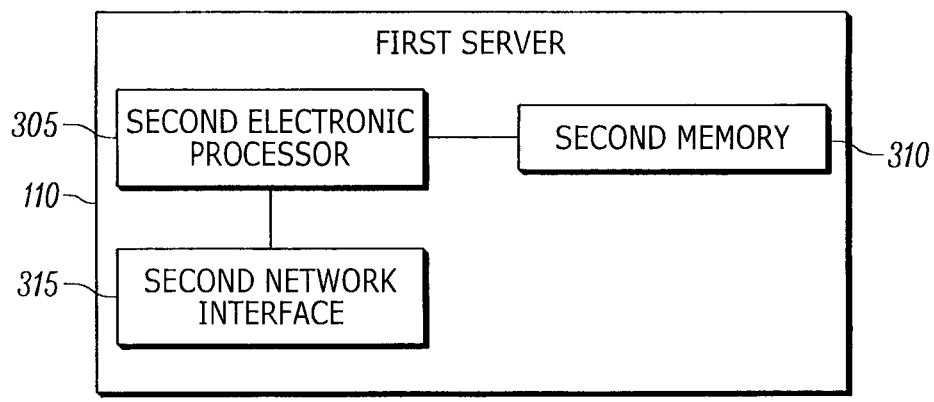
FIG. 3 is a block diagram of a first server included in the communication system of FIG. 1 according to one exemplary embodiment.

FIG. 3 is a block diagram of the first server 110 according to one embodiment. In the example illustrated, the first server 110 is a computer that includes a second electronic processor 305, a second memory 310, and a second network interface 315. These components are similar to those described above with respect to the public safety communication device 105 and perform similar functions. In some embodiments, the second server 115 includes components similar to those of the first server 110. In some embodiments, a memory of the second server 115 includes a social media database (or multiple social media databases) that stores social media information, for example, people associated with each other on social media, interests of one or more people on social media, content generated by one or more people on social media, and photographs posted on social media. In some embodiments, the second server 115 is a device that provides access to one or more sources of social media information via the network 125 or via another network similar to the network 125. In some embodiments, the communication system 100 includes multiple second servers 115 that allow multiple social media databases to be accessible via the network 125.

The communication system 100 provides information relating to the crowd 126 to the first server 110 over the network 125 through the second network interface 315. The second electronic processor 305 is configured to identify hierarchical structures of members of the crowd 126 based on the information received from the public safety communication device 105, other similar public safety communication devices, the first camera 120, other similar cameras, the access points 140, the mobile communication devices 150, and the second server 115.

Figure 4:
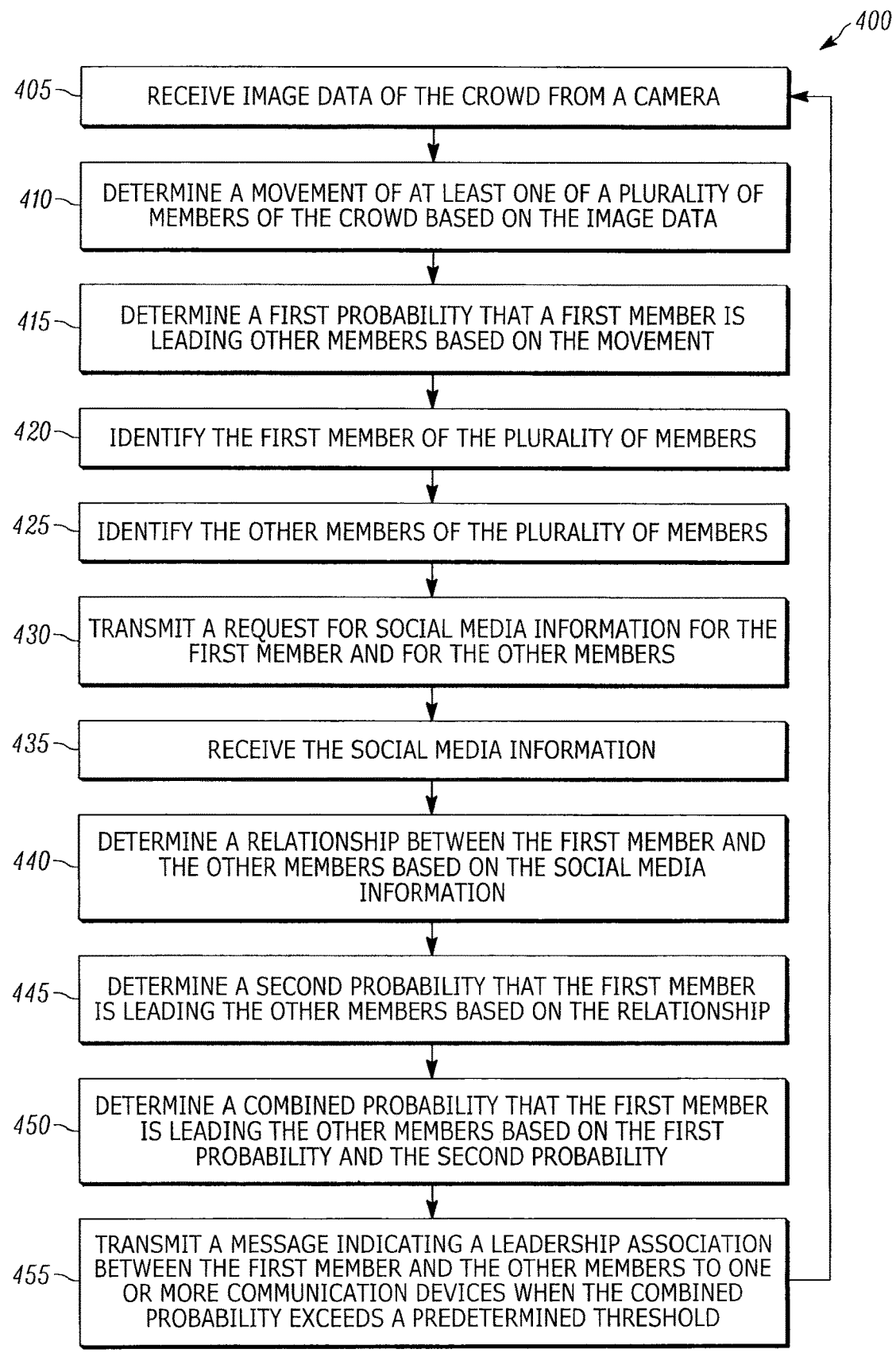
FIG. 4 is a flowchart of a method of identifying hierarchical structures of members of a crowd performed by the communication system of FIG. 1 according to one exemplary embodiment.

FIG. 4 illustrates a method 400 of identifying hierarchical structures of members of a crowd (for example, the crowd 126 of FIG. 1) in accordance with one embodiment. Although the method 400 is described as being executed by the second electronic processor 305 of the first server 110, in some embodiments, the method 400 is performed by other devices of the communication system 100. For example, in some embodiments, the method 400 is performed by at least one of the public safety communication device 105 and one or more of the mobile communication devices 150. In such embodiments, devices such as the second server 115, the first camera 120, and the access points 140 provide information to the at least one of the public safety communication device 105 and the one or more mobile communication devices 150.

In some embodiments, the method 400 is used to monitor one or more crowds of people at a sporting event, a protest, a festival, and the like. In many cases, certain people in the crowd 126 may be leading or influencing other people in the crowd 126. The method 400 identifies hierarchical structures of members of the crowd 126 by retrieving and evaluating information that may not be known or readily apparent to public safety personnel at the scene of the crowd 126.

In the example illustrated, the second electronic processor 305 of the first server 110 receives image data of the crowd 126 from the first camera 120 through the second network interface 315, at block 405. In some embodiments, the second electronic processor 305 receives image data from the second camera 220 of the public safety communication device 105.

In some embodiments, the second electronic processor 305 also receives information from at least one of the public safety communication device 105, the access points 140, and the mobile communication devices 150. Such information may relate to a received signal strength indication (RSSI) of a wireless signal received from each of the citizen communication devices 130 and 135 by the at least one of the public safety communication device 105, the access points 140, and the mobile communication devices 150. For example, the citizen communication devices 130 and 135 may broadcast a wireless signal such that each of the public safety communication device 105, the access points 140, and the mobile communication devices 150 within communication range of the citizen communication devices 130 and 135 may determine the received signal strength of the wireless signal. In some embodiments, one or more of the public safety communication device 105, the access points 140, and the mobile communication devices 150 may broadcast a request for citizen communication devices 130 and 135 to broadcast a respective wireless signal to be used to determine the received signal strength. In other embodiments, the citizen communication devices 130 and 135 may periodically broadcast a respective wireless signal without receiving a request to broadcast. Based on the received signal strength indication information from each of the public safety communication device 105, the access points 140, and the mobile communication devices 150, the second electronic processor 305 may determine the proximity of each of the citizen communication devices 130 and 135 to each of the public safety communication device 105, the access points 140, and the mobile communication devices 150. In turn, based on this proximity detection and based on known locations of the public safety communication device 105, the access points 140, and the mobile communication devices 150 (for example, each location may be determined from received geographic coordinates from the geographic coordinate system 235 of each of the public safety communication device 105, the access points 140, and the mobile communication devices 150), the second electronic processor 305 may determine a location of each of the citizen communication devices 130 and 135.

At block 410, the second electronic processor 305 determines a movement of at least one of a plurality of members of the crowd 126 based on the image data. In some embodiments, the second electronic processor 305 includes a video analytics engine to analyze the image data from the first camera 120 to determine movement of members of the crowd 126. In some embodiments, the video analytics engine uses changes in the image data over a period of time to determine the movement of at least one of a plurality of members of the crowd 126. For example, in some embodiments, the video analytics engine determines the distance to or the movement of an object or member of the crowd 126 based on at least one of the size of the object or member of the crowd 126 from the perspective of the first camera 120, a resolution of the first camera 120, a lens of the first camera 120, a height of the first camera 120, and the like. For example, the video analytics engine may determine that a plurality of members is moving through the crowd 126. As another example, the video analytics engine may determine that a plurality of members of the crowd 126 are merging at location or moving away from a location. As another example, the video analytics engine may determine that a single member or a plurality of members of the crowd 126 are moving back and forth in between other members of the crowd 126 or back and forth in between two or more locations.

In some embodiments, the second electronic processor 305 determines a movement of at least one of a plurality of members of the crowd 126 using the proximity detection of the citizen communication devices 130 and 135 as described previously herein. For example, the second electronic processor 305 uses changes in the proximity of the citizen communication devices 130 and 135 to the public safety communication device 105, the access points 140, and the mobile communication devices 150 over a period of time to determine the movement of at least one of a plurality of members of the crowd 126. In other words, as the received signal strength indication information from each of the public safety communication device 105, the access points 140, and the mobile communication devices 150 changes for the citizen communication devices 130 and 135, the second electronic processor 305 may determine movement of the citizen communication devices 130 and 135 based on such changes. Similar examples of monitoring the movement of members of the crowd 126 as were described previously herein also apply to such embodiments.

At block 415, the second electronic processor 305 determines a first probability that a first member is leading other members of the plurality of members of the crowd 126 based on the movement determined by the video analytics engine. For example, when a plurality of members is determined to be moving through the crowd 126, the second electronic processor 305 may identify a first member at the front of the movement as a potential leader of the plurality of members. As another example, when members of the crowd 126 are determined to be moving back and forth in between a first member of the crowd 126 and another location, the second electronic processor 305 may identify the first member as a potential leader. The second electronic processor 305 may determine the first probability based on a type of movement, a duration of movement, a number of members of the crowd 126 involved in the movement, and the like. For example, the second electronic processor 305 may determine that the first probability is higher when the first member has been at the front of a movement for at least one minute than when the first member has been at the front of a movement for less than ten seconds. As another example, the second electronic processor 305 may increase the first probability each time a member of the crowd 126 moves back and forth between the first member and another location.

In some embodiments, the second electronic processor 305 uses historical data of previous similar crowd movements to determine the first probability. For example, the second memory 310 may store data corresponding to previous image data and previous proximity data of crowd member movement in other situations and whether members of the crowd 126 were later determined to be leading other members of the crowd 126. The second electronic processor 305 may compare current movements of the plurality of members to this historical data and use the comparison when determining the first probability. For example, when a current crowd movement is highly similar to a previous crowd movement, the second electronic processor 305 may increase the first probability by twenty percent. As another example, when the current crowd movement is less similar to the previous crowd movement but still shares some similarities, the second electronic processor 305 may increase the first probability by five percent.

At block 420, the second electronic processor 305 identifies the first member of the plurality of members of the crowd 126. At block 425, the second electronic processor 305 identifies the other members of the plurality of members of the crowd 126. In some embodiments, the video analytics engine performs facial recognition of the first member and the other members using the image data received from the first camera 120. The second electronic processor 305 compares results of the facial recognition to photographs in at least one of a public records database, a social media database, and the like to identify the first member and the other members.

At block 430, the second electronic processor 305 transmits, through the second network interface 315, a request for social media information for the first member and the other members to another computer (for example, second server 115). At block 435, the second electronic processor 305 receives, through the second network interface 315, the social media information from the second server 115. The social media information may include, for example, people associated with each other on social media, interests of one or more people on social media, content generated by one or more people on social media, recent activity of people on social media, and photographs posted on social media.

At block 440, the second electronic processor 305 determines a relationship between the first member and the other members based on the social media information. In some embodiments, the second electronic processor 305 includes a social media analytics engine to analyze the social media information. For example, in some embodiments, the social media analytics engine determines at least one of whether the first member and the other members are associated with each other on one or more social media platforms, whether the first member and the other members share one or more common interests, how often the first member generates content on social media, how often the other members view the content generated by the first member, whether the other members have subscribed or registered to receive content generated by the first member on one or more social media platforms, whether the first member and the other members have posted similar information, how many photographs that the first member and the other members are in together, whether and how often the first member and the other members have communicated with each other on social media, and a number of common acquaintances that the first member and the other members have on social media.

At block 445, the second electronic processor 305 determines a second probability that the first member is leading the other members based on relationship determined by the social media analytics engine. For example, the second electronic processor 305 may determine that the second probability is higher when the other members view the content generated by the first member on social media than when the other members do not view the content generated by the first member on social media. As another example, the second electronic processor 305 may increase the second probability for each common acquaintance or common interest between the first member and the other members on social media. As another example, the second electronic processor 305 may determine that the second probability is higher when the first member communicates with the other members on social media than when the first member does not communicate with the other members on social media.

In some embodiments, the social media analytics engine also determines a relationship between two or more of the other members of the plurality of members of the crowd 126. Such a determination may be made in a similar manner as described previously herein with respect to the relationship between the first member and the other members. The second electronic processor 305 may use the relationship between two or more of the other members to determine the second probability. For example, the second electronic processor 305 may determine that the second probability is higher when two or more of the other members view the content generated by each other than when the other members do not view the content generated by each other. In such an example, a strong relationship between the other members based on social media information may indicate a more organized group than when the other members do not have a strong relationship with each other based on social media information.

As described previously with respect to the first probability, in some embodiments, the second electronic processor 305 uses historical data of previous similar crowd member relationships to determine the second probability. For example, the second memory 310 may store data corresponding to previous social media information of crowd members in other situations and whether members of the crowd 126 were later determined to be leading other members of the crowd 126. The second electronic processor 305 may compare current relationships of the plurality of members to this historical data and use the comparison when determining the second probability. For example, when a current social media relationship between members of the crowd 126 is highly similar to previous social media relationships between members of a previous crowd 126, the second electronic processor 305 may increase the second probability by twenty percent. As another example, when the current social media relationship between members of the crowd 126 is less similar to the previous social media relationship but still shares some similarities, the second electronic processor 305 may increase the second probability by five percent.

At block 450, the second electronic processor 305 determines a combined probability that the first member is leading the other members based on the first probability and the second probability. In some embodiments, the second electronic processor 305 determines the combined probability by calculating the average of the first probability and the second probability. In such embodiments, the first probability and the second probability are given equal weight in the determination of the combined probability. In some embodiments, the first probability and the second probability are weighted differently. For example, in some embodiments, when social media information is only available from one social media platform, the second electronic processor 305 may give more weight to the first probability than the second probability. In this example, the second electronic processor 305 may calculate a weighted average of the first probability and the second probability by assigning the first probability a weight of sixty percent and the second probability a weight of forty percent when calculating the weighted average. This example and the percentages mentioned previously are merely exemplary. In some embodiments, the weighted average used to determine the combined probability is different and depends on additional or different characteristics.

In some embodiments, the second electronic processor 305 compares the combined probability to a predetermined threshold (for example, fifty percent). In some embodiments, the second electronic processor 305 compares the first probability to a first predetermined threshold and compares the second probability to a second predetermined threshold (for example, fifty percent for each threshold). In such embodiments, the second electronic processor 305 may adjust the first predetermined threshold or the second predetermined threshold depending on the first probability or the second probability. For example, in some embodiments, when the first probability is above seventy percent, the second electronic processor 305 may lower the second predetermined threshold from its original value to a lower value (for example, from fifty percent to twenty percent).

At block 455, the second electronic processor 305 transmits a message, via the second network interface 315, indicating a leadership association between the first member and the other members to one or more public safety communication devices 105 when the combined probability exceeds the predetermined threshold (or in some embodiments as described previously, when the first probability exceeds the first predetermined threshold and the second probability exceeds the second predetermined threshold). In some embodiments, the message includes information relating to a probable leader (in other words, the first member of the plurality of members of the crowd 126) and probable followers (in other words, the other members of the plurality of members of the crowd 126). In some embodiments, such information includes, for example, names of probable leaders and followers, pictures of probable leaders and followers, criminal records of probable leaders and followers, interests of probable leaders and followers as determined by the social media analytics engine, and other publicly available information relating to probable leaders and followers. In some embodiments, the public safety communication device 105 displays the information from the message on the display 230. For example, in some embodiments, the display 230 displays a name and a picture of a probable leader in the crowd 126.

Although the method 400 is described as identifying a first member as a leader of a plurality of members, in some embodiments, the second electronic processor 305 identifies more than one member of the plurality of members as a probable leader. In such embodiments, the message transmitted to the one or more public safety communication devices 105 may include information relating to multiple probable leaders.

In some embodiments, the method 400 is performed by the public safety communication device 105 (and, in particular, the first electronic processor 205). In such embodiments, the first electronic processor 205 may transmit a message, via the first network interface 215, indicating a leadership association between the first member and the other members to one or more external devices (for example, other public safety communication devices, the first server 110, the mobile communication devices 150, and the like) when the combined probability exceeds a predetermined threshold.

As indicated in FIG. 4, in some embodiments, the second electronic processor 305 repeats the method 400 to dynamically determine leadership associations of members of the crowd 126 and to determine leadership associations among multiple pluralities of members of the crowd 126. For example, as the method 400 repeats, the video analytics engine of the second electronic processor 305 may recognize a new movement by a plurality of members of the crowd 126. In such an example, the second electronic processor 305 may regenerate at least one of the first probability, the second probability, and the combined probability based on the new movement.

In some embodiments, the video analytics engine determines when members of the crowd 126 are looking at a citizen communication device 130 or 135 by analyzing image data from the first camera 120. In some embodiments, the social media analytics engine determines when members of the crowd 126 are using a citizen communication device 130 or 135 based on the social media information from the second server 115. For example, when the social media analytics engine receives social media information that indicates one or more members of the crowd 126 recently posted on social media, the social media analytics engine determines that those members are using citizen communication devices 130 or 135.

In some embodiments, the second electronic processor 305 determines whether a movement of a plurality of members of the crowd 126 was instructed, via social media, by a first member of the crowd 126. For example, in some embodiments, the second electronic processor 305 compares the movement of the plurality of members determined by the video analytics engine to social media information posted by the first member. For example, the second electronic processor 305 may recognize that the first member posted instructions to meet at a certain location on social media. The second electronic processor 305 may also determine that other members of the crowd 126 that are associated with the first member on social media moved to the location. In this example, the second electronic processor 305 may determine that there is a high probability that the first member is leading the other members of the crowd 126.

In some embodiments, at block 430, the second electronic processor 305 transmits the request for social media information when the first probability exceeds a predetermined threshold. For example, in some embodiments, when the first probability that the first member is leading the other members is twenty percent or greater, the second electronic processor 305 transmits the request for social media information for the first members and the other members. In such an example, when the first probability is less than twenty percent, the second electronic processor 305 may not transmit the request for social media information.

In some embodiments, the communication system 100 identifies a role of one or more members of the crowd 126. For example, in some embodiments, the communication system 100 identifies a tactical leader, a bodyguard, a delivery person, and the like. For example, the second electronic processor 305 may identify a delivery person based on the video analytics engine determining that a single member of the crowd 126 is moving through the crowd 126. In this example, the second electronic processor 305 may also receive facial recognition information of the single member from the video analytics engine and identify the single member as described previously. The second electronic processor 305 may receive social media information of the single member from the second server 115 to confirm that the single member is employed as a delivery person. The second electronic processor 305 may also transmit a message, via the second network interface 315, that indicates the single member is a delivery person to one or more public safety communication devices 105.

In some embodiments, the second electronic processor 305 transmits a control signal to the first camera 120 to control the first camera 120 to capture image data of an identified member of the crowd 126. For example, when the second electronic processor 305 identifies the first member as a probable leader, the video analytics engine tracks movement of the first member based on image data received from the first camera 120. In this example, the second electronic processor 305 sends a control signal to the first camera 120 such that the first camera 120 adjusts its field of view (in other words, the first camera 120 pans or tilts to continue viewing the first member). In some embodiments, the first camera 120 adjust its focus (for example, zoom in or zoom out) in accordance with information or commands in the control signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for identifying hierarchical structures of members of a crowd, the method comprising:
   receiving, with a network interface of a computer, image data of the crowd from a camera;
   determining, with a video analytics engine of the computer, a movement of at least one of a plurality of members of the crowd based on the image data;
   determining, with an electronic processor of the computer, a first probability that a first member of the plurality of members is leading other members of the plurality of members based on the movement;
   identifying, with the video analytics engine of the computer, the first member of the plurality of members;
   identifying, with the video analytics engine of the computer, the other members of the plurality of members;
   transmitting, with the network interface of the computer, a request for social media information for the first member and for the other members to another computer;

receiving, with the network interface of the computer, the social media information;

determining, with a social media analytics engine of the computer and based on the social media information, a relationship between the first member and the other members;

determining, with the electronic processor of the computer, a second probability that the first member is leading the other members based on the relationship;

determining, with the electronic processor of the computer, a combined probability that the first member is leading the other members based on the first probability and the second probability; and transmitting, with the network interface of the computer, a message indicating a leadership association between the first member and the other members to one or more communication devices when the combined probability exceeds a predetermined threshold.

2. The method of claim 1, wherein
identifying, with the video analytics engine of the computer, the first member includes recognizing a first face of the first member; and
identifying, with the video analytics engine of the computer, the other members includes recognizing second faces of the other members.

3. The method of claim 1, further comprising determining, with the video analytics engine of the computer, when one or more of the plurality of members of the crowd are looking at a respective citizen communication device.

4. The method of claim 1, further comprising determining, with the social media analytics engine, whether the movement was instructed by the first member.

5. The method of claim 1, further comprising determining, with the social media analytics engine and based on the social media information, a second relationship between at least one of the other of the plurality of members of the crowd and another of the other of the plurality of members of the crowd.

6. The method of claim 1, wherein transmitting, with the network interface of the computer, the request for the social media information includes transmitting, with the network interface of the computer, the request for the social media information when the first probability exceeds a second predetermined threshold.

7. The method of claim 1, wherein determining, with the social media analytics engine and based on the social media information, the relationship between the first member and the other members includes determining, with the social media analytics engine and based on the social media information, whether the first member and the other members have at least one of the group consisting of one or more common acquaintances, one or more common interests, and similar posted information as each other.

8. A computer for identifying hierarchical structures of members of a crowd, the computer comprising:
an electronic processor with a video analytics engine and a social media analytics engine; and
a network interface;
wherein the computer is configured to
receive, with the network interface, image data of the crowd from a camera;
determine, with the video analytics engine, a movement of at least one of a plurality of members of the crowd based on the image data;
determine, with the electronic processor, a first probability that a first member of the plurality of members is leading other members of the plurality of members based on the movement;
identify, with the video analytics engine, the first member of the plurality of members;
identify, with the video analytics engine, the other members of the plurality of members;
transmit, with the network interface, a request for social media information for the first member and for the other members to a second computer;
receive, with the network interface, the social media information;
determine, with the social media analytics engine and based on the social media information, a relationship between the first member and the other members;
determine, with the electronic processor, a second probability that the first member is leading the other members based on the relationship;
determine, with the electronic processor, a combined probability that the first member is leading the other members based on the first probability and the second probability; and
transmit, with the network interface, a message indicating a leadership association between the first member and the other members to one or more communication devices when the combined probability exceeds a predetermined threshold.

9. The computer of claim 8, wherein the social media analytics engine determines whether the movement was instructed by the first member.

10. The computer of claim 8, wherein the social media analytics engine determines, a second relationship between at least one of the other of the plurality of members of the crowd and another of the other of the plurality of members of the crowd based on the social media information.

11. The computer of claim 8, wherein the network interface transmits the request for the social media information when the first probability exceeds a second predetermined threshold.

12. A communication device comprising:
an electronic processor with a video analytics engine and a social media analytics engine;
a display; and
a network interface;
wherein the communication device is configured to
receive, with the network interface, image data of a crowd from a camera;
determine, with the video analytics engine, a movement of at least one of a plurality of members of the crowd based on the image data;
determine, with the electronic processor, a first probability that a first member of the plurality of members is leading other members of the plurality of members based on the movement;
identify, with the video analytics engine, the first member of the plurality of members;
identify, with the video analytics engine, the other members of the plurality of members;
transmit, with the network interface, a request for social media information for the first member and for the other members to a computer;
receive, with the network interface, the social media information;
determine, with the social media analytics engine and based on the social media information, a relationship between the first member and the other members;

determine, with the electronic processor, a second probability that the first member is leading the other members based on the relationship;

determine, with the electronic processor, a combined probability that the first member is leading the other members based on the first probability and the second probability; and display a leadership association between the first member and the other members on the display when the combined probability exceeds a predetermined threshold.

13. The communication device of claim 12, wherein the network interface transmits a message indicating the leadership association between the first member and the other members to one or more external devices when the combined probability exceeds the predetermined threshold.

14. The communication device of claim 12, further comprising a second camera configured to capture second image data of the crowd, wherein the video analytics engine is configured to determine the movement of the at least one of the plurality of members of the crowd based on the second image data.

15. The communication device of claim 12, wherein the video analytics engine identifies the first member by recognizing a first face of the first member; and identifies the other members by recognizing second faces of the other members.

16. The communication device of claim 12, wherein the video analytics engine determines when one or more of the plurality of members of the crowd are looking at a respective citizen communication device.

17. The communication device of claim 12, wherein the social media analytics engine determines whether the movement was instructed by the first member.

18. The communication device of claim 12, wherein the social media analytics engine determines, a second relationship between at least one of the other of the plurality of members of the crowd and another of the other of the plurality of members of the crowd based on the social media information.

19. The communication device of claim 12, wherein the network interface transmits the request for the social media information when the first probability exceeds a second predetermined threshold.

20. The communication device of claim 12, wherein the social media analytics engine determines whether the first member and the other members have at least one of the group consisting of one or more common acquaintances, one or more common interests, and similar posted information as each other.

* * * * *